United States Patent
Habal et al.

(10) Patent No.: US 11,683,284 B2
(45) Date of Patent: *Jun. 20, 2023

(54) DISCOVERING GRAYMAIL THROUGH REAL-TIME ANALYSIS OF INCOMING EMAIL

(71) Applicant: Abnormal Security Corporation, San Francisco, CA (US)

(72) Inventors: Rami F. Habal, San Francisco, CA (US); Kevin Lau, San Francisco, CA (US); Sharan Dev Sankar, Brooklyn, NY (US); Yea So Jung, San Mateo, CA (US); Dhruv Purushottam, San Mateo, CA (US); Venkat Krishnamoorthi, San Jose, CA (US); Franklin X. Wang, Bellevue, WA (US); Jeshua Alexis Bratman, San Francisco, CA (US); Jocelyn Mikael Raphael Beauchesne, San Francisco, CA (US); Abhijit Bagri, San Francisco, CA (US); Sanjay Jeyakumar, Berkeley, CA (US)

(73) Assignee: Abnormal Security Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/743,048

(22) Filed: May 12, 2022

(65) Prior Publication Data

US 2022/0272062 A1 Aug. 25, 2022

Related U.S. Application Data

(63) Continuation of application No. 17/509,772, filed on Oct. 25, 2021, now Pat. No. 11,528,242.

(Continued)

(51) Int. Cl.
*H04L 51/08* (2022.01)
*H04L 51/42* (2022.01)
(Continued)

(52) U.S. Cl.
CPC .............. *H04L 51/08* (2013.01); *G06F 9/544* (2013.01); *G06Q 10/107* (2013.01); *H04L 51/212* (2022.05); *H04L 51/42* (2022.05)

(58) Field of Classification Search
None
See application file for complete search history.

(56) References Cited

U.S. PATENT DOCUMENTS

| 5,999,932 | A | * | 12/1999 | Paul ...................... H04L 51/212 |
| 6,023,723 | A | * | 2/2000 | McCormick ......... G06Q 10/107 707/999.102 |

(Continued)

FOREIGN PATENT DOCUMENTS

CN 107315954 11/2017

OTHER PUBLICATIONS

Barngrover, Adam, "Vendor Access Management with IGA", Saviynt Inc. Apr. 24, 2019 (Apr. 24, 2019) Retrieved on Apr. 17, 2021 (Apr. 17, 2021) from <https://saviynt.com/vendor-access-management-with-iga/> entire document, 2 pp.

(Continued)

*Primary Examiner* — Backhean Tiv
(74) *Attorney, Agent, or Firm* — Van Pelt, Yi & James LLP

(57) ABSTRACT

Techniques for identifying and processing graymail are disclosed. An electronic message store is accessed. A determination is made that a first message included in the electronic message store represents graymail, including by accessing a profile associated with an addressee of the first (Continued)

message. A remedial action is taken in response to determining that the first message represents graymail.

23 Claims, 6 Drawing Sheets

Related U.S. Application Data

(60) Provisional application No. 63/105,020, filed on Oct. 23, 2020.

(51) Int. Cl.
*H04L 51/212* (2022.01)
*G06Q 10/107* (2023.01)
*G06F 9/54* (2006.01)

(56) References Cited

U.S. PATENT DOCUMENTS

| | | | |
|---|---|---|---|
| 6,088,717 A | 7/2000 | Reed | |
| 6,161,130 A * | 12/2000 | Horvitz | H04L 51/212 707/999.005 |
| 6,816,884 B1 * | 11/2004 | Summers | H04L 51/48 709/228 |
| 7,263,506 B2 | 8/2007 | Lee | |
| 7,451,487 B2 | 11/2008 | Oliver | |
| 7,546,351 B1 * | 6/2009 | Horstmann | H04W 4/12 709/248 |
| 7,577,709 B1 * | 8/2009 | Kolcz | G06F 18/24155 706/20 |
| 7,610,344 B2 * | 10/2009 | Mehr | H04L 63/1491 715/205 |
| 7,953,814 B1 | 5/2011 | Chasin | |
| 8,112,484 B1 * | 2/2012 | Sharma | H04L 51/212 726/13 |
| 8,131,655 B1 * | 3/2012 | Cosoi | G06N 3/045 706/12 |
| 8,191,138 B1 * | 5/2012 | Emigh | H04L 51/212 726/22 |
| 8,214,437 B1 * | 7/2012 | Alspector | G06F 16/353 709/200 |
| 8,244,532 B1 | 8/2012 | Begeja | |
| 8,566,938 B1 | 10/2013 | Prakash | |
| 8,805,934 B2 * | 8/2014 | Dargahi | G06F 16/907 709/206 |
| 8,819,819 B1 | 8/2014 | Johnston | |
| 8,935,788 B1 | 1/2015 | Diao | |
| 9,009,824 B1 | 4/2015 | Chen | |
| 9,021,560 B1 * | 4/2015 | Emigh | H04L 9/3268 726/4 |
| 9,154,514 B1 | 10/2015 | Prakash | |
| 9,177,293 B1 * | 11/2015 | Gagnon | H04L 51/212 |
| 9,213,827 B2 | 12/2015 | Li | |
| 9,245,115 B1 | 1/2016 | Jakobsson | |
| 9,245,225 B2 * | 1/2016 | Winn | G06N 3/08 |
| 9,264,418 B1 | 2/2016 | Crosley | |
| 9,348,981 B1 | 5/2016 | Hearn | |
| 9,473,437 B1 | 10/2016 | Jakobsson | |
| 9,516,053 B1 | 12/2016 | Muddu | |
| 9,537,880 B1 | 1/2017 | Jones | |
| 9,571,512 B2 | 2/2017 | Ray | |
| 9,686,308 B1 | 6/2017 | Srivastava | |
| 9,756,007 B1 * | 9/2017 | Stringhini | H04L 51/216 |
| 9,774,626 B1 | 9/2017 | Himler | |
| 9,781,152 B1 | 10/2017 | Mistratov | |
| 9,847,973 B1 | 12/2017 | Jakobsson | |
| 9,940,394 B1 * | 4/2018 | Grant | H04L 51/08 |
| 9,946,789 B1 * | 4/2018 | Li | G06F 16/93 |
| 9,954,805 B2 * | 4/2018 | Nigam | G06N 20/00 |
| 9,961,096 B1 | 5/2018 | Pierce | |
| 9,967,268 B1 | 5/2018 | Hewitt | |
| 10,015,182 B1 | 7/2018 | Shintre | |
| 10,044,745 B1 | 8/2018 | Jones | |
| 10,091,312 B1 | 10/2018 | Khanwalkar | |
| 10,104,029 B1 | 10/2018 | Chambers | |
| 10,129,194 B1 | 11/2018 | Jakobsson | |
| 10,129,288 B1 | 11/2018 | Xie | |
| 10,243,989 B1 * | 3/2019 | Ding | H04L 63/145 |
| 10,250,624 B2 | 4/2019 | Mixer | |
| 10,277,628 B1 | 4/2019 | Jakobsson | |
| 10,362,057 B1 | 7/2019 | Wu | |
| 10,397,272 B1 * | 8/2019 | Bruss | G06F 21/53 |
| 10,419,468 B2 | 9/2019 | Glatfelter | |
| 10,523,609 B1 | 12/2019 | Subramanian | |
| 10,601,865 B1 * | 3/2020 | Mesdaq | H04L 63/1425 |
| 10,616,272 B2 * | 4/2020 | Chambers | G06Q 10/107 |
| 10,673,880 B1 | 6/2020 | Pratt | |
| 10,721,195 B2 | 7/2020 | Jakobsson | |
| 10,749,818 B1 * | 8/2020 | Bikumala | G06F 40/20 |
| 10,834,127 B1 | 11/2020 | Yeh | |
| 10,911,489 B1 | 2/2021 | Chechik | |
| 10,972,483 B2 | 4/2021 | Thomas | |
| 10,972,485 B2 | 4/2021 | Ladnai | |
| 11,019,076 B1 | 5/2021 | Jakobsson | |
| 11,451,576 B2 | 9/2022 | Kao | |
| 11,494,421 B1 * | 11/2022 | Ghafourifar | H04L 51/066 |
| 11,528,242 B2 * | 12/2022 | Habal | H04L 51/08 |
| 2002/0002520 A1 | 1/2002 | Gatto | |
| 2002/0116463 A1 * | 8/2002 | Hart | H04L 51/212 709/206 |
| 2002/0147988 A1 * | 10/2002 | Nakano | H04N 7/173 725/112 |
| 2002/0161782 A1 * | 10/2002 | Bozionek | G06Q 10/107 |
| 2003/0009698 A1 * | 1/2003 | Lindeman | H04L 63/08 709/224 |
| 2003/0050988 A1 * | 3/2003 | Kucherawy | H04L 51/212 709/206 |
| 2003/0204569 A1 * | 10/2003 | Andrews | H04L 51/212 709/206 |
| 2003/0212745 A1 * | 11/2003 | Caughey | G06Q 30/0239 709/206 |
| 2003/0224760 A1 * | 12/2003 | Day | H04L 67/5651 455/414.1 |
| 2004/0003283 A1 * | 1/2004 | Goodman | G06Q 10/107 726/30 |
| 2004/0024719 A1 * | 2/2004 | Adar | G06N 5/00 706/46 |
| 2004/0030913 A1 | 2/2004 | Liang | |
| 2004/0039786 A1 * | 2/2004 | Horvitz | H04L 67/306 709/207 |
| 2004/0083270 A1 * | 4/2004 | Heckerman | H04L 51/212 709/207 |
| 2004/0088359 A1 * | 5/2004 | Simpson | G06Q 10/107 709/206 |
| 2004/0117450 A1 | 6/2004 | Campbell | |
| 2004/0128355 A1 | 7/2004 | Chao | |
| 2004/0167964 A1 * | 8/2004 | Rounthwaite | H04L 51/212 709/206 |
| 2004/0186848 A1 * | 9/2004 | Kobashikawa | G06Q 10/107 707/999.102 |
| 2004/0215977 A1 * | 10/2004 | Goodman | H04L 51/212 726/22 |
| 2004/0260922 A1 * | 12/2004 | Goodman | G06Q 10/107 713/154 |
| 2004/0267557 A1 * | 12/2004 | Liu | G06Q 10/10 705/1.1 |
| 2004/0267886 A1 * | 12/2004 | Malik | H04L 51/212 709/206 |
| 2005/0039019 A1 * | 2/2005 | Delany | H04L 61/4511 713/176 |
| 2005/0044423 A1 * | 2/2005 | Mellmer | H04L 63/104 726/4 |
| 2005/0055414 A1 * | 3/2005 | Laakkonen | H04L 51/214 709/207 |
| 2005/0076240 A1 * | 4/2005 | Appleman | H04L 51/48 726/4 |
| 2005/0101306 A1 * | 5/2005 | Zabawskyj | H04L 65/1079 455/414.1 |
| 2005/0102366 A1 * | 5/2005 | Kirsch | G06Q 10/107 709/229 |

(56) References Cited

U.S. PATENT DOCUMENTS

| | | | |
|---|---|---|---|
| 2005/0165895 A1* | 7/2005 | Rajan | G06Q 10/107 709/206 |
| 2005/0187934 A1 | 8/2005 | Motsinger | |
| 2005/0198518 A1* | 9/2005 | Kogan | H04L 63/1441 713/188 |
| 2005/0204006 A1* | 9/2005 | Purcell | H04L 51/212 709/206 |
| 2005/0288961 A1* | 12/2005 | Tabrizi | G06Q 30/02 717/126 |
| 2006/0036698 A1* | 2/2006 | Hebert | H04L 51/212 709/206 |
| 2006/0053203 A1* | 3/2006 | Mijatovic | H04L 51/212 709/206 |
| 2006/0161989 A1* | 7/2006 | Reshef | G06Q 10/107 726/26 |
| 2006/0168024 A1* | 7/2006 | Mehr | H04L 63/14 709/206 |
| 2006/0191012 A1 | 8/2006 | Banzhof | |
| 2006/0253581 A1 | 11/2006 | Dixon | |
| 2006/0277259 A1* | 12/2006 | Murphy | H04L 51/212 709/206 |
| 2007/0016613 A1* | 1/2007 | Foresti | G06Q 10/107 |
| 2007/0038705 A1* | 2/2007 | Chickering | H04L 51/212 709/206 |
| 2007/0074169 A1 | 3/2007 | Chess | |
| 2007/0112830 A1* | 5/2007 | Danas | G06F 16/90324 707/999.102 |
| 2007/0276851 A1 | 11/2007 | Friedlander | |
| 2008/0005249 A1* | 1/2008 | Hart | G06Q 10/107 709/206 |
| 2008/0052398 A1* | 2/2008 | Elshishiny | G06Q 10/107 709/226 |
| 2008/0059586 A1* | 3/2008 | Keohane | G06Q 10/107 709/206 |
| 2008/0059590 A1* | 3/2008 | Sarafijanovic | H04L 51/212 709/206 |
| 2008/0086532 A1 | 4/2008 | Cunningham | |
| 2008/0114684 A1 | 5/2008 | Foster | |
| 2008/0127345 A1* | 5/2008 | Holtmanns | H04L 51/212 726/23 |
| 2008/0133526 A1* | 6/2008 | Haitani | G06F 16/58 |
| 2008/0147669 A1* | 6/2008 | Liu | G06F 16/951 |
| 2008/0162651 A1* | 7/2008 | Madnani | H04L 67/02 709/206 |
| 2008/0172468 A1* | 7/2008 | Almeida | G06Q 10/107 709/206 |
| 2008/0201401 A1* | 8/2008 | Pugh | H04L 63/1483 709/201 |
| 2008/0294730 A1* | 11/2008 | Oral | G06Q 10/107 709/206 |
| 2008/0319932 A1* | 12/2008 | Yih | G06Q 10/10 706/20 |
| 2009/0037350 A1 | 2/2009 | Rudat | |
| 2009/0100073 A1* | 4/2009 | Dargahi | G06F 16/285 |
| 2009/0125528 A1* | 5/2009 | Choi | G06Q 10/107 |
| 2009/0132490 A1 | 5/2009 | Okraglik | |
| 2009/0149203 A1* | 6/2009 | Backholm | H04L 51/212 455/466 |
| 2009/0181651 A1* | 7/2009 | Klassen | H04W 8/08 455/414.1 |
| 2009/0287618 A1* | 11/2009 | Weinberger | H04L 51/212 706/10 |
| 2010/0017476 A1* | 1/2010 | Shue | G06Q 10/00 709/206 |
| 2010/0036786 A1* | 2/2010 | Pujara | H04L 51/212 706/46 |
| 2010/0115040 A1* | 5/2010 | Sargent | H04L 51/42 709/206 |
| 2010/0145900 A1* | 6/2010 | Zheng | H04L 51/212 709/206 |
| 2010/0211641 A1* | 8/2010 | Yih | G06F 15/16 709/206 |
| 2010/0223349 A1* | 9/2010 | Thorson | H04L 51/212 705/347 |
| 2010/0250579 A1* | 9/2010 | Levow | G06Q 10/107 707/769 |
| 2010/0318614 A1 | 12/2010 | Sager | |
| 2011/0035451 A1* | 2/2011 | Smith | G06Q 10/107 715/822 |
| 2011/0173142 A1* | 7/2011 | Dasgupta | G06N 20/00 709/206 |
| 2011/0179126 A1* | 7/2011 | Wetherell | H04W 4/14 709/206 |
| 2011/0213869 A1 | 9/2011 | Korsunsky | |
| 2011/0214157 A1 | 9/2011 | Korsunsky | |
| 2011/0231510 A1 | 9/2011 | Korsunsky | |
| 2011/0231564 A1 | 9/2011 | Korsunsky | |
| 2011/0238855 A1 | 9/2011 | Korsunsky | |
| 2011/0282948 A1* | 11/2011 | Vitaldevara | G06Q 10/107 709/206 |
| 2011/0282954 A1* | 11/2011 | Flake | H04W 12/12 709/206 |
| 2012/0028606 A1 | 2/2012 | Bobotek | |
| 2012/0042017 A1* | 2/2012 | Fried | H04L 51/212 709/206 |
| 2012/0110672 A1* | 5/2012 | Judge | H04L 51/212 709/206 |
| 2012/0137367 A1 | 5/2012 | Dupont | |
| 2012/0143962 A1* | 6/2012 | Bank | G06Q 10/107 709/206 |
| 2012/0191716 A1* | 7/2012 | Omoigui | H01L 27/14647 707/E17.069 |
| 2012/0215861 A1* | 8/2012 | Smith | G06Q 10/107 709/206 |
| 2012/0233662 A1 | 9/2012 | Scott-Cowley | |
| 2012/0253924 A1* | 10/2012 | Giese | G06Q 30/02 705/14.48 |
| 2012/0278887 A1 | 11/2012 | Krish | |
| 2012/0290712 A1 | 11/2012 | Walter | |
| 2012/0297484 A1 | 11/2012 | Srivastava | |
| 2013/0024910 A1* | 1/2013 | Verma | H04L 51/52 726/3 |
| 2013/0041955 A1 | 2/2013 | Chasin | |
| 2013/0086180 A1* | 4/2013 | Midgen | G06F 16/353 709/206 |
| 2013/0086261 A1 | 4/2013 | Lim | |
| 2013/0097709 A1 | 4/2013 | Basavapatna | |
| 2013/0167207 A1 | 6/2013 | Davis | |
| 2013/0191469 A1* | 7/2013 | Dichiu | H04L 51/212 709/206 |
| 2013/0191759 A1* | 7/2013 | Bhogal | G06F 3/048 715/752 |
| 2013/0304742 A1* | 11/2013 | Roman | H04L 51/212 707/740 |
| 2014/0013441 A1 | 1/2014 | Hencke | |
| 2014/0032589 A1 | 1/2014 | Styler | |
| 2014/0181223 A1* | 6/2014 | Homsany | H04L 51/08 709/206 |
| 2014/0325662 A1 | 10/2014 | Foster | |
| 2014/0365303 A1* | 12/2014 | Vaithilingam | G06F 16/9535 705/14.54 |
| 2014/0379825 A1* | 12/2014 | Speier | H04L 51/224 709/206 |
| 2014/0380478 A1 | 12/2014 | Canning | |
| 2015/0026027 A1 | 1/2015 | Priess | |
| 2015/0128274 A1 | 5/2015 | Giokas | |
| 2015/0143456 A1 | 5/2015 | Raleigh | |
| 2015/0149921 A1* | 5/2015 | Hariharan | H04L 63/102 715/745 |
| 2015/0161609 A1 | 6/2015 | Christner | |
| 2015/0161611 A1 | 6/2015 | Duke | |
| 2015/0188862 A1* | 7/2015 | Ghafourifar | G06F 16/951 709/206 |
| 2015/0228004 A1 | 8/2015 | Bednarek | |
| 2015/0234831 A1 | 8/2015 | Prasanna Kumar | |
| 2015/0237068 A1 | 8/2015 | Sandke | |
| 2015/0244657 A1* | 8/2015 | Ghafourifar | H04L 51/066 709/206 |
| 2015/0295942 A1 | 10/2015 | Tao | |

(56) References Cited

U.S. PATENT DOCUMENTS

| | | | |
|---|---|---|---|
| 2015/0295945 A1 | 10/2015 | Canzanese, Jr. | |
| 2015/0319157 A1* | 11/2015 | Sherman | H04L 67/1095 726/7 |
| 2015/0339477 A1 | 11/2015 | Abrams | |
| 2015/0381544 A1* | 12/2015 | Geva | H04L 51/02 715/752 |
| 2016/0014151 A1* | 1/2016 | Prakash | H04L 45/74 726/22 |
| 2016/0036829 A1 | 2/2016 | Sadeh-Koniecpol | |
| 2016/0057167 A1 | 2/2016 | Bach | |
| 2016/0063277 A1 | 3/2016 | Vu | |
| 2016/0072749 A1* | 3/2016 | Lu | H04L 51/42 709/206 |
| 2016/0156654 A1 | 6/2016 | Chasin | |
| 2016/0227367 A1 | 8/2016 | Alsehly | |
| 2016/0253598 A1 | 9/2016 | Yamada | |
| 2016/0262128 A1* | 9/2016 | Hailpern | G06F 40/10 |
| 2016/0301705 A1 | 10/2016 | Higbee | |
| 2016/0306812 A1* | 10/2016 | McHenry | G06F 16/93 |
| 2016/0321243 A1 | 11/2016 | Walia | |
| 2016/0328526 A1 | 11/2016 | Park | |
| 2016/0344770 A1 | 11/2016 | Verma | |
| 2016/0380936 A1* | 12/2016 | Gunasekara | G06Q 10/107 709/206 |
| 2017/0041296 A1 | 2/2017 | Ford | |
| 2017/0048273 A1 | 2/2017 | Bach | |
| 2017/0063869 A1* | 3/2017 | Treleaven | H04L 51/08 |
| 2017/0098219 A1 | 4/2017 | Peram | |
| 2017/0111506 A1 | 4/2017 | Strong | |
| 2017/0142056 A1* | 5/2017 | Ganin | H04L 67/75 |
| 2017/0186112 A1 | 6/2017 | Polapala | |
| 2017/0214701 A1 | 7/2017 | Hasan | |
| 2017/0222960 A1* | 8/2017 | Agarwal | G06Q 10/107 |
| 2017/0223046 A1 | 8/2017 | Singh | |
| 2017/0230323 A1* | 8/2017 | Jakobsson | H04L 63/0227 |
| 2017/0230403 A1 | 8/2017 | Kennedy | |
| 2017/0237754 A1 | 8/2017 | Todorovic | |
| 2017/0237776 A1* | 8/2017 | Higbee | H04L 51/42 726/1 |
| 2017/0251006 A1 | 8/2017 | Larosa | |
| 2017/0289191 A1 | 10/2017 | Thioux | |
| 2017/0324689 A1* | 11/2017 | Baek | H04L 51/214 |
| 2017/0324767 A1 | 11/2017 | Srivastava | |
| 2017/0346853 A1 | 11/2017 | Wyatt | |
| 2018/0026926 A1* | 1/2018 | Nigam | G06N 20/00 709/206 |
| 2018/0027006 A1 | 1/2018 | Zimmermann | |
| 2018/0084003 A1 | 3/2018 | Uriel | |
| 2018/0084013 A1 | 3/2018 | Dalton | |
| 2018/0091453 A1 | 3/2018 | Jakobsson | |
| 2018/0091476 A1 | 3/2018 | Jakobsson | |
| 2018/0109480 A1* | 4/2018 | Syrowitz | G06Q 10/107 |
| 2018/0131652 A1* | 5/2018 | Smith | H04L 51/212 |
| 2018/0159808 A1* | 6/2018 | Pal | H04L 51/212 |
| 2018/0188896 A1* | 7/2018 | Ghafourifar | G06F 40/30 |
| 2018/0189347 A1* | 7/2018 | Ghafourifar | G06F 9/541 |
| 2018/0196942 A1 | 7/2018 | Kashyap | |
| 2018/0205691 A1* | 7/2018 | Osipkov | G06Q 10/107 |
| 2018/0219817 A1* | 8/2018 | Zang | H04L 67/535 |
| 2018/0219823 A1* | 8/2018 | Mohan | G06Q 10/107 |
| 2018/0219888 A1 | 8/2018 | Apostolopoulos | |
| 2018/0227324 A1 | 8/2018 | Chambers | |
| 2018/0232441 A1* | 8/2018 | Lin | G06N 20/00 |
| 2018/0295146 A1 | 10/2018 | Kovega | |
| 2018/0324297 A1* | 11/2018 | Kent | H04Q 3/0029 |
| 2018/0375814 A1* | 12/2018 | Hart | H04L 67/306 |
| 2019/0014143 A1 | 1/2019 | Syme | |
| 2019/0026461 A1 | 1/2019 | Cidon | |
| 2019/0028509 A1* | 1/2019 | Cidon | H04L 63/1425 |
| 2019/0052655 A1 | 2/2019 | Benishti | |
| 2019/0065748 A1 | 2/2019 | Foster | |
| 2019/0068616 A1* | 2/2019 | Woods | H04L 63/145 |
| 2019/0081983 A1 | 3/2019 | Teal | |
| 2019/0087428 A1* | 3/2019 | Crudele | G06F 40/279 |
| 2019/0089711 A1 | 3/2019 | Faulkner | |
| 2019/0104154 A1 | 4/2019 | Kumar et al. | |
| 2019/0109863 A1 | 4/2019 | Traore | |
| 2019/0141183 A1 | 5/2019 | Chandrasekaran | |
| 2019/0166161 A1 | 5/2019 | Anand | |
| 2019/0166162 A1 | 5/2019 | Anand | |
| 2019/0190929 A1 | 6/2019 | Thomas | |
| 2019/0190936 A1 | 6/2019 | Thomas | |
| 2019/0199745 A1 | 6/2019 | Jakobsson | |
| 2019/0205511 A1 | 7/2019 | Zhan | |
| 2019/0222606 A1 | 7/2019 | Schweighauser | |
| 2019/0238571 A1 | 8/2019 | Adir | |
| 2019/0260780 A1 | 8/2019 | Matthew | |
| 2019/0311121 A1 | 10/2019 | Martin | |
| 2019/0319905 A1 | 10/2019 | Baggett | |
| 2019/0319987 A1 | 10/2019 | Levy | |
| 2019/0349400 A1* | 11/2019 | Bruss | G06N 7/01 |
| 2019/0384911 A1 | 12/2019 | Caspi | |
| 2020/0007502 A1 | 1/2020 | Everton | |
| 2020/0021609 A1 | 1/2020 | Kuppanna | |
| 2020/0034752 A1* | 1/2020 | Luo | H04L 51/42 |
| 2020/0044851 A1* | 2/2020 | Everson | G06Q 20/401 |
| 2020/0053111 A1 | 2/2020 | Jakobsson | |
| 2020/0053120 A1* | 2/2020 | Wilcox | G06Q 10/107 |
| 2020/0067861 A1* | 2/2020 | Leddy | G06F 21/6245 |
| 2020/0068031 A1 | 2/2020 | Kursun | |
| 2020/0074078 A1 | 3/2020 | Saxe | |
| 2020/0076825 A1* | 3/2020 | Vallur | H04L 63/1441 |
| 2020/0097911 A1* | 3/2020 | Padmanaban | H04L 51/226 |
| 2020/0125725 A1 | 4/2020 | Petersen | |
| 2020/0127962 A1* | 4/2020 | Chuhadar | H04L 51/18 |
| 2020/0162483 A1 | 5/2020 | Farhady | |
| 2020/0204572 A1 | 6/2020 | Jeyakumar | |
| 2020/0250527 A1* | 8/2020 | Zhao | G06N 3/047 |
| 2020/0287936 A1 | 9/2020 | Nguyen | |
| 2020/0344251 A1 | 10/2020 | Jeyakumar | |
| 2020/0358804 A1 | 11/2020 | Crabtree | |
| 2020/0374251 A1 | 11/2020 | Warshaw | |
| 2020/0389486 A1 | 12/2020 | Jeyakumar | |
| 2020/0396190 A1 | 12/2020 | Pickman | |
| 2020/0396258 A1 | 12/2020 | Jeyakumar | |
| 2020/0412767 A1 | 12/2020 | Crabtree | |
| 2021/0021612 A1 | 1/2021 | Higbee | |
| 2021/0058395 A1 | 2/2021 | Jakobsson | |
| 2021/0091962 A1 | 3/2021 | Finke | |
| 2021/0092154 A1* | 3/2021 | Kumar | H04L 63/1416 |
| 2021/0126944 A1* | 4/2021 | Lesperance | H04L 51/42 |
| 2021/0168161 A1 | 6/2021 | Dunn | |
| 2021/0240836 A1 | 8/2021 | Hazony | |
| 2021/0272066 A1 | 9/2021 | Bratman | |
| 2021/0273950 A1* | 9/2021 | Lawson | H04L 63/20 |
| 2021/0295179 A1 | 9/2021 | Eyal Altman | |
| 2021/0329035 A1 | 10/2021 | Jeyakumar | |
| 2021/0336983 A1 | 10/2021 | Lee | |
| 2021/0352093 A1* | 11/2021 | Hassanzadeh | H04L 63/1425 |
| 2021/0360027 A1 | 11/2021 | Boyer | |
| 2021/0374679 A1 | 12/2021 | Bratman | |
| 2021/0374680 A1 | 12/2021 | Bratman | |
| 2021/0385181 A1 | 12/2021 | Parkinson | |
| 2021/0400008 A1* | 12/2021 | Khan | H04L 51/066 |
| 2021/0406836 A1* | 12/2021 | Bar-on | G06Q 10/107 |
| 2022/0021700 A1* | 1/2022 | Devlin | H04L 63/1441 |
| 2022/0131821 A1* | 4/2022 | Habal | H04L 51/08 |
| 2022/0272062 A1* | 8/2022 | Habal | H04L 51/212 |

OTHER PUBLICATIONS

International Search Report and Written Opinion dated Apr. 24, 2020 of PCT/US2019/067279 (14 pages).

Mahajan, et al., "Finding HTML Presentation Failures Using Image Comparison Techniques", ASE'14, pp. 91-98 (Year: 2014).

Mont, Marco Casassa, "Towards accountable management of identity and privacy: Sticky policies and enforceable tracing services", 14th International Workshop on Database and Expert Systems Applications, 2003. Proceedings. IEEE, 2003. Mar. 19, 2003 (Mar. 19, 2003), Retrieved on Apr. 17, 2021 (Apr. 17, 2021) from <https://ieeexplore.ieee.org/abstract/documenV1232051> entire document, Mar. 19, 2003, 17 pp.

(56) References Cited

OTHER PUBLICATIONS

Proofpoint (Proofpoint Closed-Loop Email Analysis and Response, Aug. 2018, 2 pages) (Year: 2018).

Information Security Media Group, "Multi-Channel Fraud: A Defense Plan", Retrieved on Apr. 18, 2021 (Apr. 18, 2021) from <https://www.bankInfosecurity.com/Interviews/multi-channel-fraud-defense-plan-i-1799>, Feb. 20, 2013, 9 pages.

\* cited by examiner

DISCOVERING GRAYMAIL THROUGH REAL-TIME ANALYSIS OF INCOMING EMAIL

CROSS REFERENCE TO OTHER APPLICATIONS

This application is a continuation of U.S. patent application Ser. No. 17/509,772 entitled DISCOVERING GRAYMAIL THROUGH REAL-TIME ANALYSIS OF INCOMING EMAIL filed Oct. 25, 2021, which claims priority to U.S. Provisional Patent Application No. 63/105,020 entitled DISCOVERING GRAYMAIL THROUGH REAL-TIME ANALYSIS OF INCOMING EMAIL filed Oct. 23, 2020, each of which is incorporated herein by reference for all purposes.

BACKGROUND OF THE INVENTION

Employees of enterprise organizations receive a variety of types of electronic messages. Some of these messages may be wanted (e.g., legitimate communications made among employees of a given enterprise, or made between employees and entities outside of the enterprise). Others of these messages may be malicious (e.g., attempting to compromise computing infrastructure or defraud the recipient) or otherwise unwanted. Unfortunately, differentiating between various types of messages can be a daunting task, particularly as the number of electronic messages an individual receives on a given day increases. Accordingly, there is an ongoing need for improvements to techniques for managing electronic messages.

BRIEF DESCRIPTION OF THE DRAWINGS

Various embodiments of the invention are disclosed in the following detailed description and the accompanying drawings.

DETAILED DESCRIPTION

Figure 1:
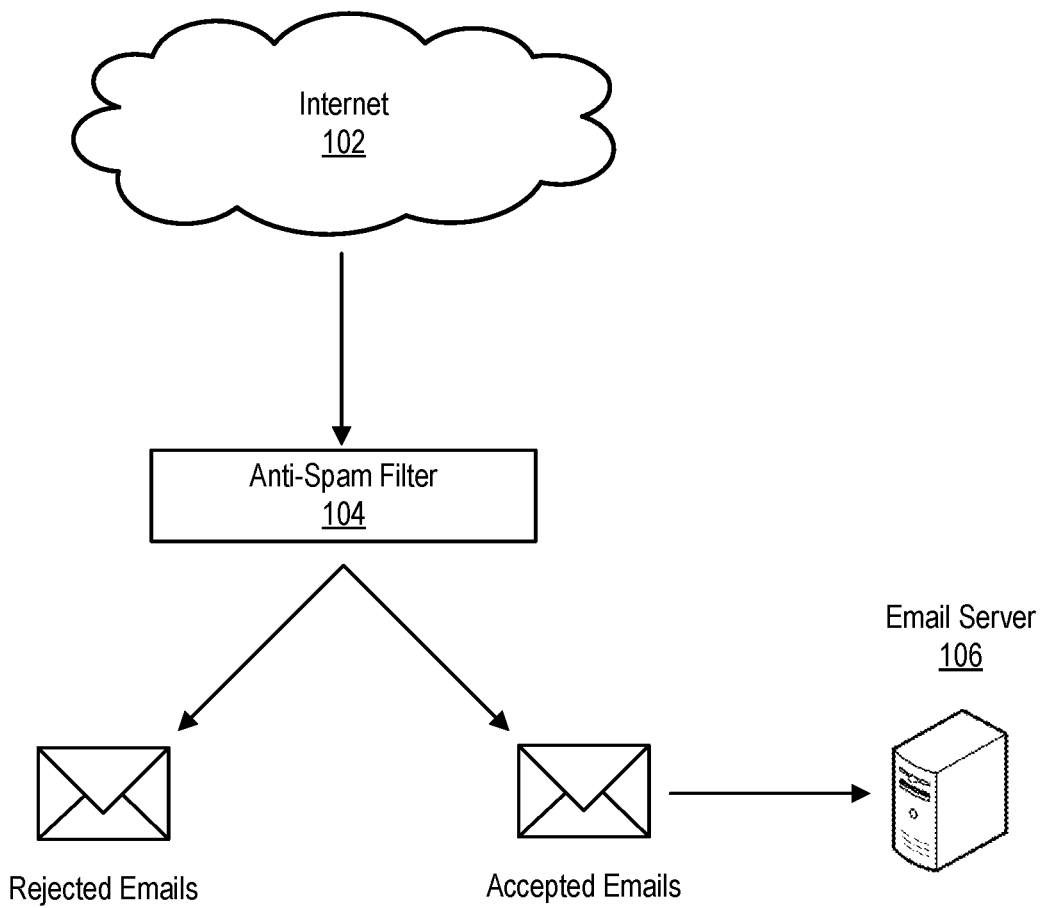
FIG. 1 illustrates how a conventional filtering service can examine incoming emails to determine which emails, if any, should be prevented from reaching their intended destination.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Introduction

The term "graymail" refers to solicited bulk email messages that do not fit the conventional definition of spam, typically because the recipient "opted into" receiving those bulk email messages. Recipient interest in this type of mailing tends to diminish, however, so the likelihood that recipients will report graymail as spam often increases over time. In comparison to spam, graymail can be identified by one or more of the following traits (though need not have all three of the following traits):

Solicited—The recipient requested to receive the email message by opting in, either directly or indirectly, via a non-obvious mechanism, such as by supplying an email address when registering for an account or registering for a conference.

Legitimate—Though the vast majority of graymail may be representative of notices, coupons, social updates, and the like, these email messages are sent by reputable sources who value their relationship with the recipient. Most of these email messages contain an unsubscribe option, with the sender honoring such requests.

Content Value—Graymail generally contains content that is targeted to the recipient or the recipient's interests, as opposed to spam that is an indiscriminate bulk distribution of unwanted solicitations, offers, and information.

In addition to the above traits, there is often a timeliness component to graymail. That is, the utility of an email message determined to be representative of graymail will normally expire or become less useful after a period of time. Notifications of sales or upcoming events are examples of graymail with timeliness components, since these email messages are only valid for a period of time even though recipients may (and often do) read these email messages after the period of time has expired.

While all recipients of graymail "opted in," either knowingly or unknowingly, to receiving bulk email messages, these email messages have varying value to different recipients. Example categories of graymail include (1) promotional messages (e.g., sale notifications, new product notifications, etc., typically targeted to a topic/product the recipient previously indicated an interest in), (2) newsletters, (3) event invitations (e.g., to conferences, fireside chats, etc.), and (4) cold calls from potential vendors/service providers, typically directed to those with purchasing authority (e.g., generated based on the sender reviewing the recipient's website profile or a profile on LinkedIn). In enterprises (also referred to as "businesses" or "organizations"), graymail can be difficult to manage as some recipients will want to receive at least some of these email messages while other recipients will perceive these email messages as spam. For example, a recipient in the purchasing department may want to receive advertisements for product pricing while a recipient in the marketing department may view these advertisements as spam. Similarly, a recipient in the engineering department may want to receive invitations to conferences/speaking opportunities, while a person in the human resources department may view such types of messages as spam. And, while cold calls may appear to be spam to certain employees, employees engaged in external business relations may consider such messages to be of high value (e.g., in establishing new partnerships). Further, different graymail folders can have differently configurable default expirations, e.g., to reflect the time sensitivity such messages typically have. For example, any graymail moved into a "newsletter" folder of a user can have a default expiration of 90 days, while any graymail moved into a "promotions" folder of the user can have a different default expiration if desired (e.g., 30 days).

Described herein are various computer programs and associated computer-implemented techniques for discovering graymail in the incoming email messages received by employees of an enterprise. For the purpose of illustration, assume that an enterprise receives an incoming email message ("email") addressed to a recipient, such as an employee of the enterprise (or one or more accounts shared by multiple such employees, etc.). To establish the risk posed by the incoming email, its content or context can be analyzed by a scoring module. For example, the scoring module can examine the incoming email to identify the alleged identity of the sender, email address of the sender, content of the subject line, content of the body, attachments, etc. Further information on example ways incoming emails can be examined can be found in U.S. Pat. No. 10,911,489, which is incorporated by reference herein in its entirety. Generally, if the incoming email is determined to represent a risk to the security of the enterprise, then the incoming email is quarantined and not permitted to reach the inbox of the recipient. However, if the scoring module determines that the incoming email does not represent a risk, then the scoring module can determine what actions, if any, are appropriate for dealing with the incoming email.

As part of this risk determination process, the scoring module may determine the likelihood that the incoming email is representative of graymail. If the scoring module determines that the incoming email is not representative of graymail, then the incoming email can be permitted to proceed to the inbox of the recipient. However, if the incoming email is determined to represent graymail, then the scoring module may indicate as much to a remediation module that is responsible for handling the incoming email. As further discussed below, the remediation module can be responsible for implementing a graymail remediation service ("remediation service") for automatically moving (e.g., using an application programming interface provided by the enterprise's mail system) incoming emails (that are representative of graymail) to appropriate folders, e.g., using native folder infrastructure of a user's mail account (whether those folders are created automatically on behalf of the user, or at the user's direction). A benefit of this approach is that, irrespective of which mail client the user chooses to access their electronic mail, graymail will be automatically sorted into an appropriate folder, without, for example, requiring modification to the mail client. Thus, a user can choose to view messages using a native mail client (e.g., provided by a phone or computer manufacturer, or an operating system provider) or third party mail client (e.g., software provided by an entity other than a device or operating system manufacturer) and receive inbox decluttering benefits described herein.

Referring again to the scenario described above, assume that the scoring module determines that the incoming email is representative of graymail but poses no risk to the security of the enterprise. In this situation, the scoring module can transmit a request to the remediation module to handle the incoming email. Initially, the remediation module may confirm that a graymail folder (also referred to herein as a "promotions folder") has been created for the recipient. Generally, the graymail folder is accessible through the employee's mailbox similar to other folders, such as sent folders, spam folders, etc. If a graymail folder was previously created, then the remediation module can transfer the incoming email into the graymail folder. However, if a graymail folder was not previously created, then the remediation module can create a graymail folder into which the incoming email is transferred. If the user subsequently moves a message in the promotions folder back to the user's inbox (e.g., as reported by a cloud-based email suite to a threat detection platform), in some embodiments, the remediation module automatically generates a rule (e.g., based on sender domain, address, etc.) to prevent future messages sent to that user by that sender from being re-routed to the user's promotions folder by the remediation module. Similarly, if the user subsequently moves a message in the promotions folder to the user's spam folder, the remediation module can automatically generate a rule to route future messages from that sender to the user's spam folder instead of to the user's promotions folder (or inbox).

Note that more than one graymail folder can be created for a given recipient. For example, the remediation module can create separate folders for different types of graymail (or as subfolders under a more general graymail folder). Thus, a single recipient may have different graymail folders for promotions, newsletters, invitations/speaking engagements, cold calls, etc. The remediation module can determine the appropriate graymail folder based on an output produced by the scoring module. For example, the remediation module may determine the appropriate graymail folder based on whether the scoring module has labeled an incoming email as representative of a promotion, advertisement, or newsletter based on analysis of its content. The scoring module can use a set of heuristics/rules and/or machine learning models to identify graymail. In an example implementation, different types of graymail can be used as ground truth training data to develop a set of models that can collectively identify graymail and further classify the graymail into one of a variety of subcategories. For example, a set of invitations to conferences/other speaking opportunities/etc. can be used to train a graymail subcategory related to such events. As another example, a set of newsletters can be used to train a graymail subcategory related to such content. The set of models (e.g., including ones specific to specific types of graymail and/or ones trained generally on graymail) can be used to classify incoming messages as graymail (and, as applicable, subcategories of graymail) and ultimately place such messages in an appropriate folder or subfolder.

Embodiments may be described herein with reference to certain types of graymail or certain features of incoming email. However, features of those embodiments may be similarly applicable to other types of graymail and other features of incoming email. As an example, while embodiments may be described in the context of a scoring module that determines risk based on the email address of the sender, the scoring module could consider other feature(s) of the incoming email instead of, or in addition to, the email address of the sender.

While embodiments may be described in the context of computer-executable instructions, aspects of the technologies described herein can be implemented via hardware, firmware, or software. As an example, the scoring module and remediation module may be embodied as instruction sets executable by a computer program that offers support for discovering, classifying, and then remediating security threats.

A. Terminology

References in this description to "an embodiment" or "one embodiment" means that the feature, function, structure, or characteristic being described is included in at least one embodiment of the technology. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," or any variant thereof is intended to include any connection or coupling between two or more elements, either direct or indirect. The connection/coupling can be physical, logical, or a combination thereof. For example, objects may be electrically or communicatively coupled to one another despite not sharing a physical connection.

The term "module" refers broadly to software components, firmware components, or hardware components. Modules are typically functional components that generate output(s) based on specified input(s). A computer program may include one or more modules. Thus, a computer program may include multiple modules responsible for completing different tasks or a single module responsible for completing all tasks.

When used in reference to a list of multiple items, the term "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

B. Conventional Filtering Services

Basic filtering services are offered by most email platforms. FIG. 1 illustrates an example of how a conventional filtering service can examine incoming emails to determine which emails, if any, should be prevented from reaching their intended destination. In some instances, an enterprise applies an anti-spam filter 104 to incoming emails received via the Internet, while in other instances another entity, such as an email service, applies the anti-spam filter 104 to the incoming emails on behalf of the enterprise. The term "external emails" may be used to refer to emails received via the Internet 102, while the term "internal emails" may be used to refer to emails that are sent within the enterprise. An example of an internal email is an intra-enterprise email (e.g., an email from one employee to another employee) that is delivered directly to the mailbox of the recipient rather than routed through the mail exchanger (MX) record, external gateways, etc.

Generally, the anti-spam filter 104 is designed to quarantine malicious emails using blacklists of senders, sender email addresses, and Uniform Resource Locators (URLs) that have been detected in past unsolicited emails or defined in policy frameworks created by the enterprise. The term "anti-spam filter," as used herein, can refer to any legacy email security mechanism capable of filtering incoming emails, including secure email gateways (SEGs) (also referred to as "gateways"). For example, the enterprise (or the email service) can maintain a list of sender email addresses from which malicious email has been received in the past. As another example, an enterprise may decide to implement a policy that prohibits employees from receiving emails originating from a given domain. Malicious emails that are caught by the anti-spam filter 104 can be quarantined so as to remain hidden from the intended recipients, while non-malicious emails may be stored on an email server 106 for subsequent access by the intended recipients. Email servers (also referred to as "mail servers") facilitate the delivery of emails from senders to recipients. Normally, an email will be transferred amongst a series of email servers as it travels toward its intended destination. This series of email servers allows emails to be sent between dissimilar address domains.

Because of the manner in which anti-spam filters are deployed, however, these filters struggle to handle graymail in an appropriate manner. As discussed above, graymail generally is not considered spam by the anti-spam filter 104 (e.g., since those email messages are transmitted by a legitimate source, contain legitimate content, etc.). And, in contrast with malicious emails (for example), which are generally universally unwanted, different users may ascribe varying degrees of value to a particular piece of graymail. Accordingly, new approaches are needed in order to appropriately handle graymail.

II. Threat Detection Platform

Figure 2:
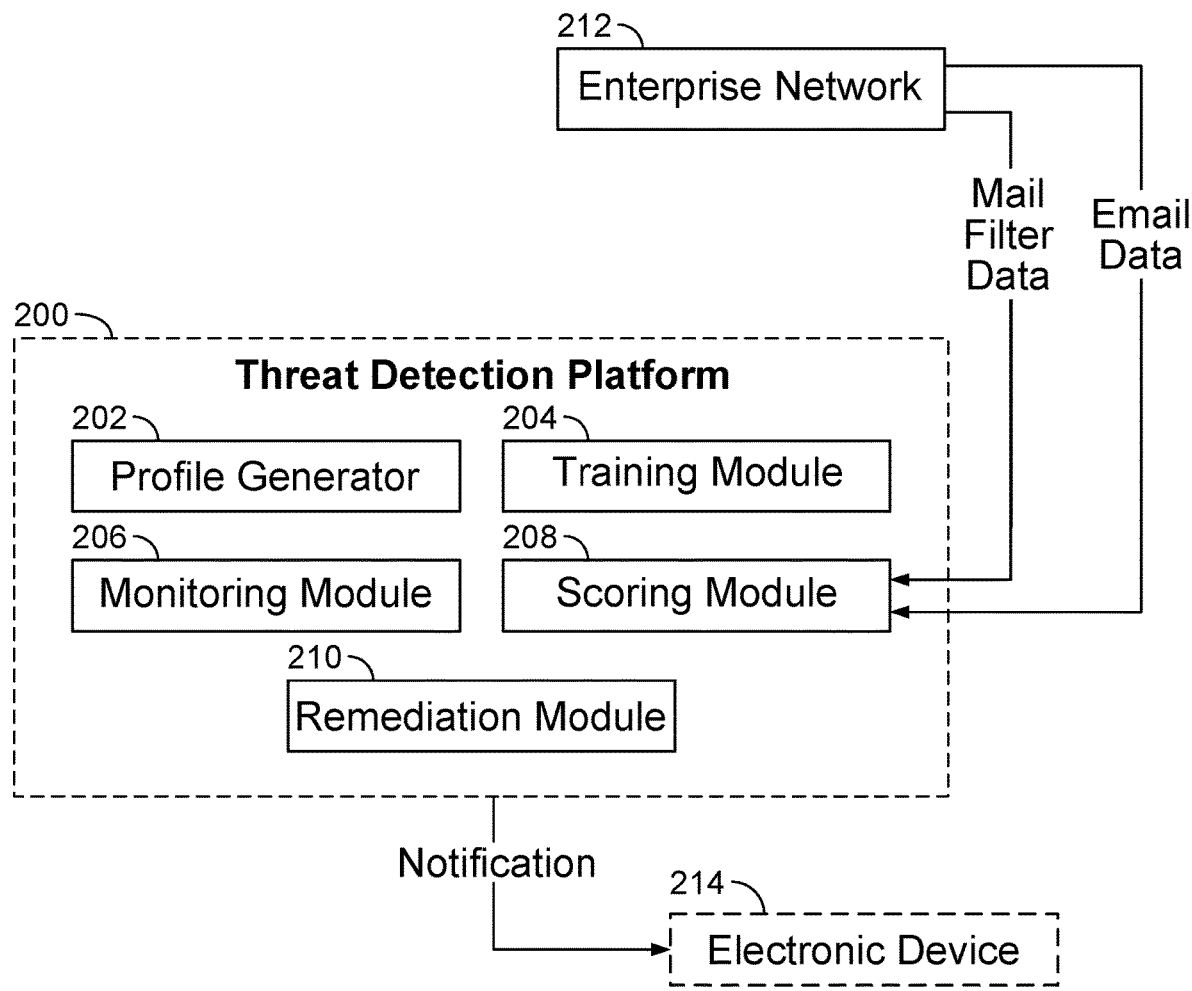
FIG. 2 depicts an example of a computer-implemented platform (also referred to as a "threat detection platform") that is designed to identify email messages that constitute graymail and handle those email messages accordingly.

FIG. 2 depicts an example of a threat detection platform 200 that is configured to identify email messages that constitute graymail and handle those email messages accordingly. As shown in FIG. 2, the threat detection platform 200 includes a profile generator 202, a training module 204, a monitoring module 206, a scoring module 208, and a remediation module 210. Some embodiments of the threat detection platform 200 include a subset of these components, while other embodiments of the threat detection platform 200 include additional components that are not shown in FIG. 2.

Threat detection platform 200 can acquire data related to digital activities performed with email accounts and then determine, based on an analysis of the data, how to handle graymail in a personalized manner. As shown in FIG. 2, the data can include information related to emails and/or mail filters. Threat detection platform 200 can identify instances of graymail based on an analysis of incoming emails (e.g., the content of the body, the email address of the sender, etc.), metadata accompanying the incoming emails (e.g., information regarding the sender, recipient, origin, time of transmission, etc.), and other suitable data.

Threat detection platform 200 can be implemented, partially or entirely, within an enterprise network 212, a remote computing environment (e.g., through which emails, or information related to those emails, can be routed for analysis), a gateway, or another suitable location. The remote computing environment can belong to, or be managed by, the enterprise or another entity. In some embodiments, threat detection platform 200 is integrated into the enterprise's email system (e.g., at the SEG) as part of an inline deployment. In other embodiments, threat detection platform 200 is integrated into the enterprise's email system via an application programming interface (API) such as the Microsoft Outlook® API. In such embodiments, threat detection platform 200 can obtain email data via the API. Thus, the threat detection platform 200 can supplement and/or supplant other security products employed by the enterprise.

In a first variation, threat detection platform 200 is maintained by a threat service (also referred to herein as a "security service") that has access to multiple enterprises' data. In this variation, threat detection platform 200 can route data related to incoming email to a computing environment managed by the security service. The computing environment can be, for example, an instance on Amazon Web Services® (AWS). Threat detection platform 200 can maintain one or more databases for each enterprise it services that include, for example, organizational charts (and/or other user/group identifiers/memberships, indicating information such as "Alice is a member of the Engineering group" and "Bob is a member of the Marketing group"), attribute baselines, communication patterns, etc. Additionally or alternatively, threat detection platform 200 can maintain federated databases that are shared among multiple entities. Examples of federated databases include databases specifying vendors and conferences for which graymail may be transmitted. The security service can maintain different instances of threat detection platform 200 for different enterprises, or the security service can maintain a single instance of the threat detection platform 200 for multiple enterprises, as applicable. The data hosted in these instances can be obfuscated, encrypted, hashed, depersonalized (e.g., by removing personal identifying information), or otherwise secured or secreted as applicable. Accordingly, in various embodiments, each instance of threat detection platform 200 is only able to access/process data related to the incoming emails addressed to email accounts associated with the corresponding enterprise(s).

In a second variation, threat detection platform 200 is maintained by the enterprise whose emails are being monitored—either remotely or on premises. In this variation, all relevant data related to incoming emails may be hosted by the enterprise itself, and any information to be shared across multiple enterprises can be transmitted to a computing system maintained by the security service or a third party, as applicable.

As shown in FIG. 2, profile generator 202, training module 204, monitoring module 206, scoring module 208, and remediation module 210 can be part of the threat detection platform 200. Alternatively, these components could be implemented individually or in various combinations. For example, remediation module 210 can be implemented in a remote computing environment to which the threat detection platform 200 is communicatively connected across a network. Threat detection platform 200 can be implemented by a security service on behalf of an enterprise or the enterprise itself. In some embodiments, aspects of threat detection platform 200 are provided by a web-accessible computer program operating on a computer server or a distributed computing system. For example, an individual can be able to interface with the threat detection platform 200 through a web browser executing on an electronic computing device (also referred to as an "electronic device" or "computing device").

Enterprise network 212 can be a mobile network, wired network, wireless network, or some other communication network (or combination of networks) maintained by the enterprise or an operator on behalf of the enterprise. As noted above, the enterprise can use a security service to examine emails (among other things) to discover possible instances of graymail. The enterprise may grant permission to the security service to monitor the enterprise network 212 by examining emails (e.g., incoming emails or outgoing emails), identifying emails that are representative of graymail, and then performing appropriate remediation actions for those emails. In some embodiments, the enterprise further grants permission to the security service to obtain data regarding other digital activities involving the enterprise (and, more specifically, employees of the enterprise) in order to build a profile that specifies communication patterns, behavioral traits, normal content of emails, etc. For example, threat detection platform 200 may identify the filters created by each employee to infer which incoming emails are representative of graymail and/or which graymail is no longer desired (and thus should be diverted). Such filters may comprise rules manually specified by the user (e.g., by the user explicitly interacting with tools made available by cloud-based email suite 308) and/or may also be inferred based on users' interactions with their mail (e.g., by obtaining from cloud-based email suite 308 log data indicating which messages the user has moved from an inbox to a promotions folder or spam folder, or vice versa) and automatically generating rules for automatically moving messages on behalf of the user in the future (without the user having to manually create such rules).

Threat detection platform 200 can manage one or more databases in which data can be stored. Examples of such data include enterprise data (e.g., email data and mail filter data), remediation policies, communication patterns, behavioral traits, and the like. The data stored in the database(s) can be determined by the threat detection platform 200 (e.g., learned from data available on the enterprise network 212), provided by the enterprise, and/or retrieved from an external database (e.g., associated with LinkedIn® or Microsoft Office 365®) as applicable. Threat detection platform 200 can also store outputs produced by the various modules, including machine- and human-readable information regarding discovered instances of graymail and any remediation actions that were taken.

As shown in FIG. 2, threat detection platform 200 includes a profile generator 202 that is responsible for generating one or more profiles for the enterprise. For example, profile generator 202 can generate a separate profile for each email account associated with an employee of the enterprise based on email data and/or mail filter data. Additionally or alternatively, profiles can be generated for business groups, organizational groups, or the enterprise as a whole. By examining email data and mail filter data, profile generator 202 can discover organizational information (e.g., employees, titles, and hierarchy), employee behavioral traits (e.g., based on historical emails and historical mail filters), normal content of incoming or outgoing emails, communication patterns (e.g., who each employee communicates with internally and externally, when each employee normally communicates), etc. This information can be populated into the profiles so that each profile can be used as a baseline for what constitutes normal activity by the corresponding email account (or group of email accounts).

An example profile includes a number of behavioral traits associated with a given email account. For example, profile generator 202 can determine behavioral traits based on email data and mail filter data obtained from the enterprise network 212. The email data may include information on the senders of past emails received by a given email account, content of those past emails, frequency of those past emails, temporal patterns of those past emails, topics of those past emails, geographical location from which those past emails originated, formatting characteristics (e.g., usage of HTML, fonts, styles, etc.), and more. Thus, profile generator 202 can attempt to build a profile for each email account that represents a model of normal behavior of the corresponding employee. As further discussed below, the profiles can be helpful in identifying the emails that are likely representative of graymail, as well as establishing how each employee handles graymail (including different types of graymail).

Monitoring module 206 is responsible for monitoring emails handled by enterprise network 212. These emails can include both incoming emails (e.g., external and internal emails) received by email accounts associated with employees of the enterprise and outgoing emails (e.g., external and internal emails) transmitted by those email accounts. Monitoring module 206 is able to monitor incoming emails in near real time so that appropriate action can be taken, in a timely fashion, if graymail is discovered. For example, if an incoming email is determined to be representative of graymail (e.g., based on an output produced by scoring module 208), the incoming email can be transferred into a dedicated folder by remediation module 210. In some embodiments, monitoring module 206 is able to monitor emails only upon threat detection platform 200 being granted permission by the enterprise (and thus given access to enterprise network 212).

Scoring module 208 can be responsible for examining emails to determine the likelihood that each email is representative of graymail. For example, scoring module 208 can examine each incoming email to determine how its characteristics compare to past emails received by the intended recipient. In such embodiments, scoring module 208 may determine whether characteristics such as timing, formatting, and location of origination (e.g., in terms of sender email address or geographical location) match a pattern of past emails that have been determined to represent graymail. For example, scoring module 208 may determine that an email is highly likely to be graymail if its formatting and content are similar to past emails received at a consistent periodic basis (e.g., daily or weekly).

Scoring module 208 can make use of heuristics, rules, neural networks, or other trained machine learning (ML) approaches such as decision trees (e.g., gradient-boosted decision trees), logistic regression, and linear regression. Accordingly, scoring module 208 can output discrete outputs or continuous outputs, such as a probability metric (e.g., specifying the likelihood that an incoming email is graymail), a binary output (e.g., graymail or not graymail), or a sub-classification (e.g., specifying the type of graymail such as promotions, newsletters, events, and cold calls).

Remediation module 210 can perform one or more remediation actions in response to scoring module 208 determining that an incoming email is likely representative of graymail. The remediation action(s) can be based on whether past instances of graymail have been handled for the same employee, the nature of the graymail, the policies implemented by the enterprise or employee, etc. These policies can be predefined or dynamically generated based on inference, analysis, or the data obtained from enterprise network 212. Additionally or alternatively, remediation action(s) may be based on the outputs produced by the models employed by the various modules, as further discussed below. Examples of remediation actions include creating a graymail folder into which emails that are representative of graymail can be transferred, transferring emails into a graymail folder, and/or transferring emails into another folder such as a quarantine folder. Generally, the graymail folder is accessible through a mail client as other folders, such as sent folders, draft folders, spam folders, etc. Accordingly, while remediation module 210 may redirect graymail before it would otherwise populate into the inbox of the intended recipient, the remediation module 210 may not make graymail inaccessible to the recipient. Stated another way, the transfer of graymail into dedicated folders can be used to declutter the inboxes of employees of the enterprise. Conversely, some graymail (e.g., those emails that may represent a threat) may be transferred to a hidden folder (also referred to as a "quarantine folder") for further analysis. Emails transferred to the hidden folder may remain inaccessible until the threat detection platform 200 has determined whether to release those emails (e.g., into the inbox or graymail folder), or other applicable event or set of events has occurred to either release it from quarantine (e.g., into an inbox or other folder) or delete it (e.g., if it is determined to represent a threat).

In some embodiments, remediation module 210 provides results produced by scoring module 208 or some other output (e.g., a notification summarizing the graymail that has been found) to an electronic device 214. Electronic device 214 may be managed by the employee associated with the email account under examination, an individual associated with the enterprise (e.g., a member of the information technology department), an individual associated with a security service, etc. In some embodiments, remediation module 210 sends the output in a human-readable format for display on an interface accessible via the electronic device 214. As an example, remediation module 210 can generate a summary of emails that were transferred to the graymail folder. This summary can be provided to the employee to whom these emails were addressed. Through electronic device 214, the employee can specify whether the appropriate action was taken. For instance, the employee may indicate that an email should not have been classified as graymail, or the employee may be able to indicate that an email should have been instead classified as spam. Such indications can be used to improve the treatment of messages sent to that employee in the future (or, as applicable, sent to others, such as sent to other members of the same organizational unit/group, enterprise, etc.).

Various embodiments of threat detection platform 200 include a training module 204 that operates to train the models employed by the other modules. As an example, training module 204 may train the models applied by scoring module 208 to the email data and mail filter data by feeding training data into those models. The training data could include emails that have been labeled as attacks or non-attacks, policies related to attributes of emails (e.g., specifying that emails originating from certain domains should not be considered graymail), etc. The training data may be employee-, group-, or enterprise-specific so that the model(s) are able to perform personalized analysis. In some embodiments, the training data ingested by the model(s) includes emails that are known to be representative of graymail. These emails may have been labeled as such during a training process, or these emails may have been labeled as such by other employees.

A. Graymail Discovery, Classification, and Remediation

Figure 3:
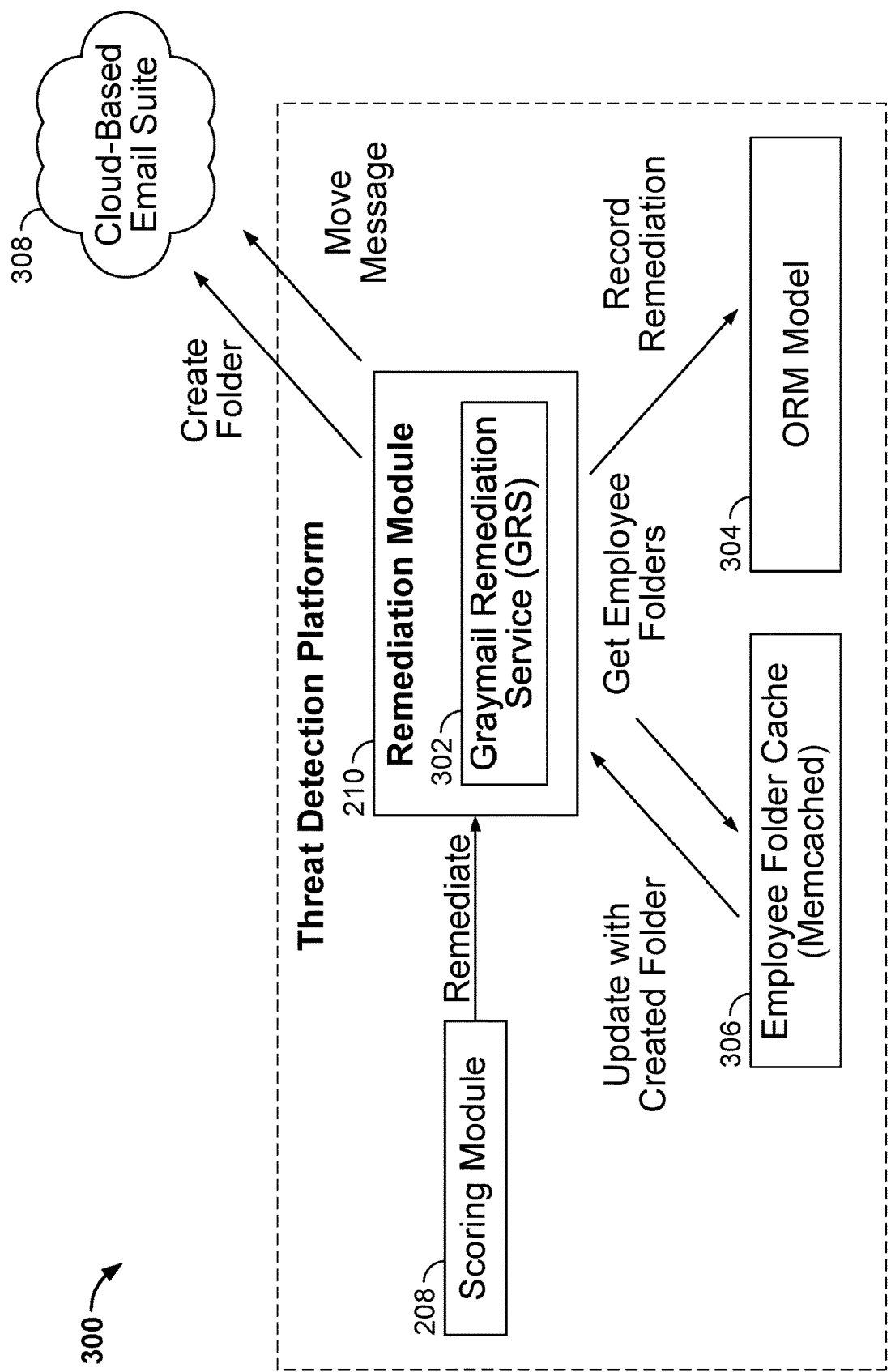
FIG. 3 illustrates an example of how a remediation module can implement a graymail remediation service.

FIG. 3 illustrates an example of how a remediation module can implement a graymail remediation service. Graymail remediation service 302 can move email representative of graymail to a dedicated folder (or a folder in a set of dedicated graymail folders). As discussed above, one aspect of graymail remediation service 302 is to create the dedicated folder(s) if one does not already exist for the intended recipient of graymail. Emails can be moved responsive to receiving a request to do so from remediation module 210 based on output(s) produced by a scoring module, or responsive to receiving a request to do so directly from the scoring module (208) as shown in FIG. 3.

Generally, remediation module 210 interacts with two forms of storage while implementing graymail remediation services. First, remediation module 210 may interact with an object-relational-mapping (ORM) model 304 for recording actions performed by graymail remediation service 302. ORM model 304 can create objects that map to relational data that define actions taken. Second, remediation module 210 may interact with a memory cache (also referred to herein as a "cache") 306 that stores a mapping of employee identifiers to folders and accompanying metadata. As an example, cache 306 can associate email accounts of employees of an enterprise with the folders that can be found in those employees' email accounts. The cache can be read by remediation module 210 in order to find each account's graymail folder(s). If no graymail folder exists and one is created by the remediation module, then the remediation module can update the cached state to indicate that a graymail folder was created.

Though training of scoring module 208 and remediation module 210 may be supervised, graymail remediation service 302 can be implemented in an entirely automated manner. Thus, in various embodiments, remediation module 210 may not require any input from the employees or enterprise whose emails are being monitored.

Figure 4:
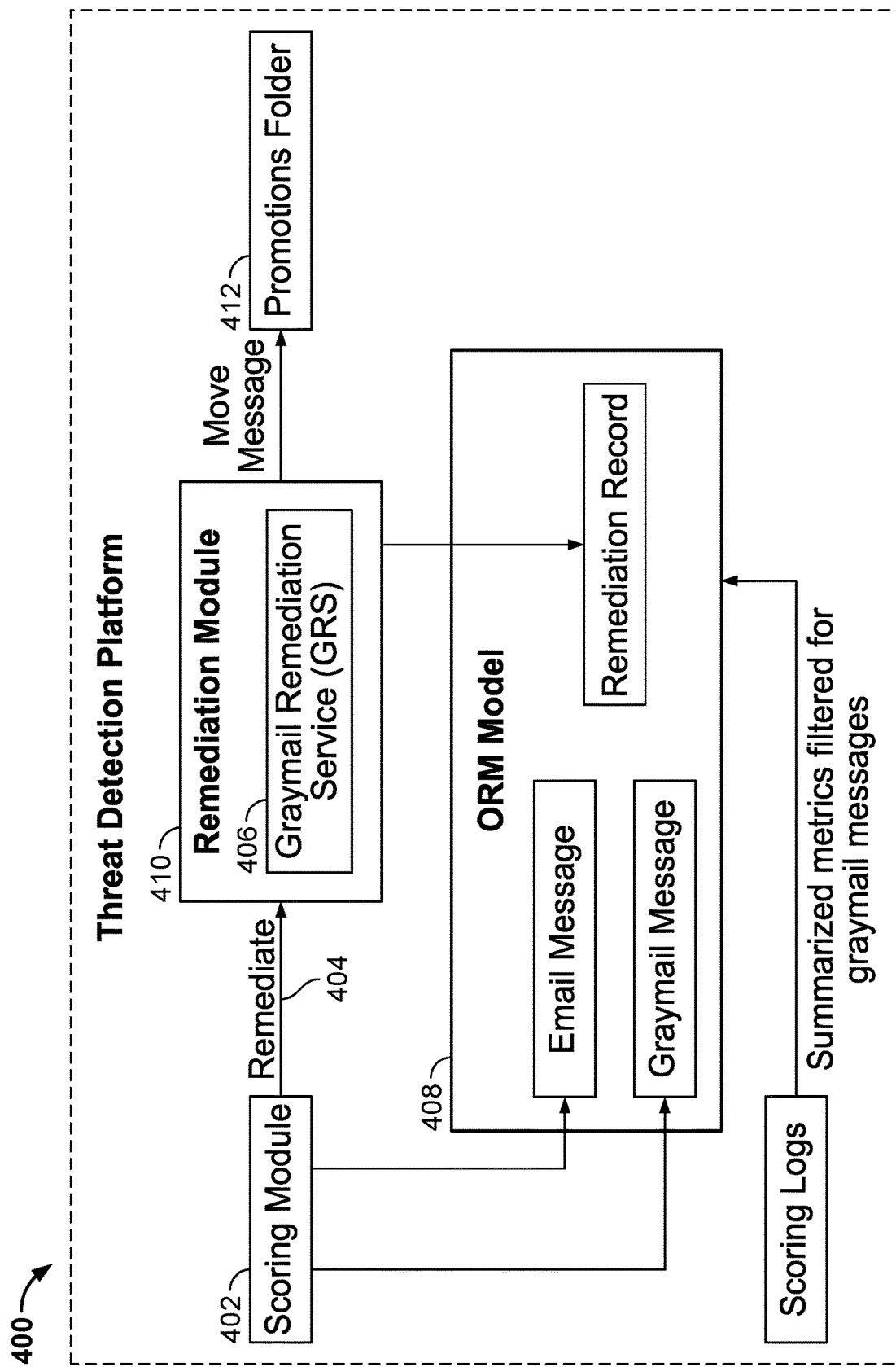
FIG. 4 illustrates an example of how a graymail remediation service can be implemented in a scalable manner.

FIG. 4 illustrates an example of how a graymail remediation service can be implemented in a scalable manner. In the embodiment shown in FIG. 4, scoring module 402 has a separate "pipeline" (404) for emails representative of graymail that (i) persists significantly less data to the ORM model (408) and (ii) directly invokes graymail remediation service 406 (e.g., rather than the general remediation service implemented by the threat detection platform to address email-based threats). The scoring module can detect emails that are representative of graymail and then perform appropriate follow-up action(s). For example, for a sample collection of graymail, scoring module 402 can send those email messages to ORM model 408 for further review. Additionally or alternatively, scoring module 402 can send all email messages determined to be graymail to remediation module 410 for handling by graymail remediation service 406.

In various embodiments, a small collection of email messages are labeled to measure live performance of graymail remediation service 406. These email messages can be stored fully in ORM model 408 so that full analysis can be performed. In other embodiments, ORM model 408 maintains one or more data structures (e.g., tables) in which information regarding graymail can be stored. For example, remediation module 410 may transmit a log of email messages moved to graymail folder 412 (also referred to as a "promotions folder") so that ORM model 408 includes a data structure that reflects the results of graymail remediation. In some embodiments, more detailed information regarding the graymail is stored in ORM model 408. For example, as shown in FIG. 4, metrics (e.g., scores indicating probability of being graymail) for those email messages determined to be graymail can be populated into the ORM model. Thus, the data populated into the data structure(s) of ORM model 408 can be filtered to include only data relevant to those email messages determined to represent graymail.

Since it is dedicated to remediating graymail, graymail remediation service 406 can be implemented in a less resource-intensive manner than a service for addressing a broad variety of security threats. Nonetheless, graymail remediation service 406 can provide various (including all) of the following guarantees in various embodiments:

Guarantee that incoming email messages are promptly moved to the promotions folder (or other appropriate folder, such as "conferences") when classified as graymail;

Guarantee that if graymail remediation service 406 receives multiple requests to move an email message, the email message is only moved once;

Guarantee that a promotions folder can be created for an email account if one does not already exist;

Guarantee that graymail remediation service 406 does not remediate email messages found in a custom folder;

Guarantee that graymail remediation service 406 does not remediate email messages caught by mail filters created by employees or the enterprise; and Guarantee (if such behavior is desired/configured by an administrator or user, for example) that email messages representative of graymail will not be moved by graymail remediation service 406 if the promotions folder is deleted, and that the graymail remediation service will not attempt to recreate the promotions folder (e.g., because the user has implicitly indicated by deleting the promotions folder that the user does not wish to participate in graymail filtering). Note that the number of guarantees may depend on the amount of resources available to the remediation module (and the threat detection platform as a whole) and the amount of insight into incoming emails that is desired.

In some embodiments, threat detection platform 400 tracks how email messages moved to promotions folder 412 are subsequently handled by a user. For example, threat detection platform 400 can employ an ML approach that tracks whether email messages moved to the promotions folder by graymail remediation service 406 are subsequently deleted by the recipient or moved to another folder (e.g., an inbox, or other folder, such as "online shopping" or "travel deals") by the user. The insights gained by this ML approach can be used in further training the remediation module to identify graymail and also in automatically handling future received messages differently (e.g., when subsequent graymail of a particular type is received, moving it to the user's custom folder, such as "travel deals").

Moreover, threat detection platform 400 can maintain a list of email addresses corresponding to employees that have explicitly or implicitly opted out of graymail remediation services. For example, threat detection platform 400 can maintain a list of email addresses corresponding to employees who have deleted or renamed the promotions folders made for them by the remediation module. This information may be useful to the enterprise, for example, to identify those employees who have opted not to have graymail automatically filtered. Further follow up (e.g., from the enterprise or a security service) may indicate that these employees find too many non-graymail emails have been transferred to the promotions folder, or that these employees prefer the mail filters that have been manually created to capture graymail originating from certain sources, etc.

B. Managing Graymail at Scale

Many individuals will receive upwards of one hundred times more graymail than emails related to sophisticated attacks (e.g., phishing). A threat detection platform could store the same amount of data per graymail message as per "attack" message discovered by monitoring inbound email. However, such an approach could result in too much data being stored. Because the storage system (also referred to herein as "storage infrastructure") is shared across different services supported by the threat detection platform, overloading the storage system could impact production of the threat detection platform as a whole. As an example, making too many email messages available for labeling (and training/model creation) may result in overflow of the queue for review. To handle data at such scales, in various embodiments, threat detection platform 400 includes, or has access to, a tiered storage system ("tiered data persistence") in which graymail occupies only a fraction of the total storage space. Moreover, graymail can be processed by distinct lightweight modules (e.g., those described above with reference to FIG. 2) that allow compute to be scaled efficiently.

An example way of implementing tiered data persistence is to control the percentage of graymail for which data is stored in a tiered storage system (e.g., for use as training data, for use in verification of system reliability, etc.). As an example, threat detection platform 400 can store minimal information (e.g., only that information needed for identification purposes) and metadata for most graymail, and threat detection platform 400 can store complete information for a small subset of the rest of the graymail. An example goal is to store complete information for less than 1, 3, or 5 percent of all graymail. In some embodiments, an administrator or other appropriate individual is able to specify the applicable percentage through an interface provided by the threat detection platform (e.g., an administrative web frontend). Additionally or alternatively, threat detection platform 400 can automatically determine and/or manage the percentage based on predetermined parameters, such as the amount of available computing resources, and/or the rate at which graymail is being received.

In various embodiments, threat detection platform 400 implements a dedicated series of interconnected modules (referred to collectively as a "pipeline") for handling only graymail. Assume, for example, that threat detection platform 400 includes a scoring module that is responsible for making an initial determination as to whether each incoming email message should be classified as safe, unsafe (i.e., representative of an attack), or graymail. Threat detection platform 400 can include logic to ensure that the module(s) responsible for subsequently handling emails determined to be attacks and the module(s) responsible for subsequently handling graymail do not operate on the same message. The former can be referred to as "attack modules," while the latter can be referred to as "graymail modules." While an initial verdict of whether a given email is in fact unsafe may change due to subsequent analysis (e.g., by a human or machine), an initial classification of a message as graymail can be treated (e.g., by graymail modules) as final, because graymail is, in large part, readily confirmable. As such, simplifications can be made that are not possible with the attack modules. Example benefits of using a dedicated graymail pipeline include:

As analysis of attacks and graymail are largely decoupled, they can be scaled independently;

Storage and processing costs can be kept low despite the large amounts of graymail needing to be handled.

C. Passive Mode for Graymail Discovery Service

An enterprise might desire to initially observe how threat detection platform 400 will handle messages in accordance with techniques described herein before fully implementing graymail handling services (e.g., during a trial period of days, weeks, or months). During that time, threat detection platform 400 can detect and report graymail (and actions that would have been otherwise taken) without actually moving those email messages or otherwise changing recipients' mailboxes. Because the threat detection platform is passively monitoring incoming email messages without impeding those email messages from reaching the intended destination, this mode can also be referred to as "passive mode" for the graymail services.

One benefit of passive mode is that it permits entities to experience a risk-free trial during which confidence in the graymail discovery service can be established. Entities can observe/confirm whether graymail services are behaving as intended (e.g., by identifying graymail, or as applicable, particular subcategories of graymail that should be filtered from recipients' inboxes). A second benefit of passive mode is that it allows adjustments to be made to threat detection platform 400 (e.g., adjustments to be made to settings/configurations of graymail remediation service 406) to adjust performance as necessary. As an example, tuning can be performed for each entity whose email messages are being monitored to account for differences (e.g., in the senders, content, or relevance of incoming messages) between entities. Since the email landscape is different for each entity, this trial period allows changes to be learned by, or implemented in, models employed by the threat detection platform. In some embodiments, during passive mode, employees are encouraged to forward examples of graymail that they receive to dedicated training data collection email addresses (e.g., newsletters@examplecompany.com or events@examplecompany.com) to help customize/tune models/heuristics more specifically to that organization/its users. Further, either during and/or after operating in passive mode, employees can be encouraged to manually move graymail from their inboxes to a graymail folder, or from a spam folder to their inboxes (or a graymail folder), etc. Such user actions, observed by a threat detection platform (e.g., using API calls/log data provided by cloud-based email suite 308) can be used by the threat detection platform to fine-tune graymail handling based on individual preferences. As an example, a first employee may wish to send all airline-related promotions to a graymail folder, while a second employee may wish to send the same messages to a spam folder (or some to a spam folder and some to an inbox, etc.).

The threat detection platform can automatically generate different rules for future handling of such messages on behalf of the two different users' actions/preferences.

D. Example Processing System

Figure 5:
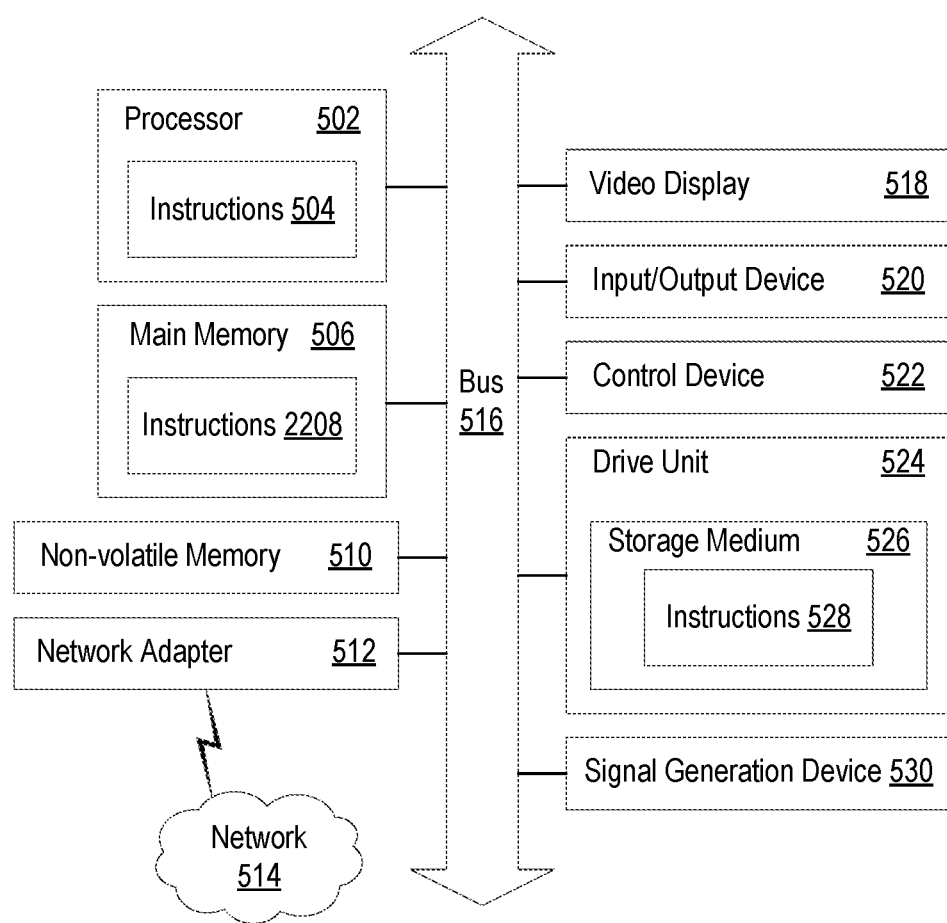
FIG. 5 is a block diagram illustrating an example of a processing system in which at least some operations described herein can be implemented.

FIG. 5 is a block diagram illustrating an example of a processing system 500 in which at least some operations described herein can be implemented. For example, components of processing system 500 can be hosted on one or more electronic devices used to provide a threat detection platform (e.g., threat detection platform 200 of FIG. 2).

Processing system 500 includes a processor 502, main memory 506, non-volatile memory 510, network adapter 512 (e.g., a network interface), video display 518, input/output device 520, control device 522 (e.g., a keyboard, pointing device, or mechanical input such as a button), drive unit 524 that includes a storage medium 526, or signal generation device 530 that are communicatively connected to a bus 516. Bus 516 is illustrated as an abstraction that represents one or more physical buses and/or point-to-point connections that are connected by appropriate bridges, adapters, or controllers. Bus 516, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit (I2C) bus, and/or a bus compliant with Institute of Electrical and Electronics Engineers (IEEE) Standard 1394, etc.

While main memory 506, non-volatile memory 510, and storage medium 526 are shown to be a single medium, the terms "storage medium" and "machine-readable medium" should be taken to include a single medium or multiple media that store one or more sets of instructions 528. The terms "storage medium" and "machine-readable medium" should also be taken to include any medium that is capable of storing, encoding, or carrying a set of instructions for execution by the processing system 500. Further examples of machine- and computer-readable media include recordable-type media such as volatile and non-volatile memory devices 510, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

In general, the routines executed to implement embodiments described herein can be implemented as part of an operating system or a specific application, component, program, object, module, or sequence of instructions (collectively referred to as "computer programs"). The computer programs typically comprise one or more instructions (e.g., instructions 504, 508, and/or 528) set at various times in various memories and storage devices in an electronic device. When read and executed by processor 502, the instructions cause processing system 500 to perform operations to execute various aspects of techniques described herein.

Network adapter 512 allows processing system 500 to mediate data in a network 514 with an entity that is external to the processing system 500 through any communication protocol supported by the processing system 500 and the external entity. Examples of network adapter 512 include a network adaptor card, a wireless network interface card, a switch, a protocol converter, a gateway, a bridge, a hub, a receiver, a repeater, and/or a transceiver that includes an integrated circuit (e.g., enabling communication over Bluetooth or Wi-Fi), etc.

Techniques introduced here can be implemented using software, firmware, hardware, or a combination of such forms. For example, various aspects can be implemented using special-purpose hardwired (i.e., non-programmable) circuitry in the form of application-specific integrated circuits (ASICs), programmable logic devices (PLDs), field-programmable gate arrays (FPGAs), and the like.

E. Example Process

Figure 6:
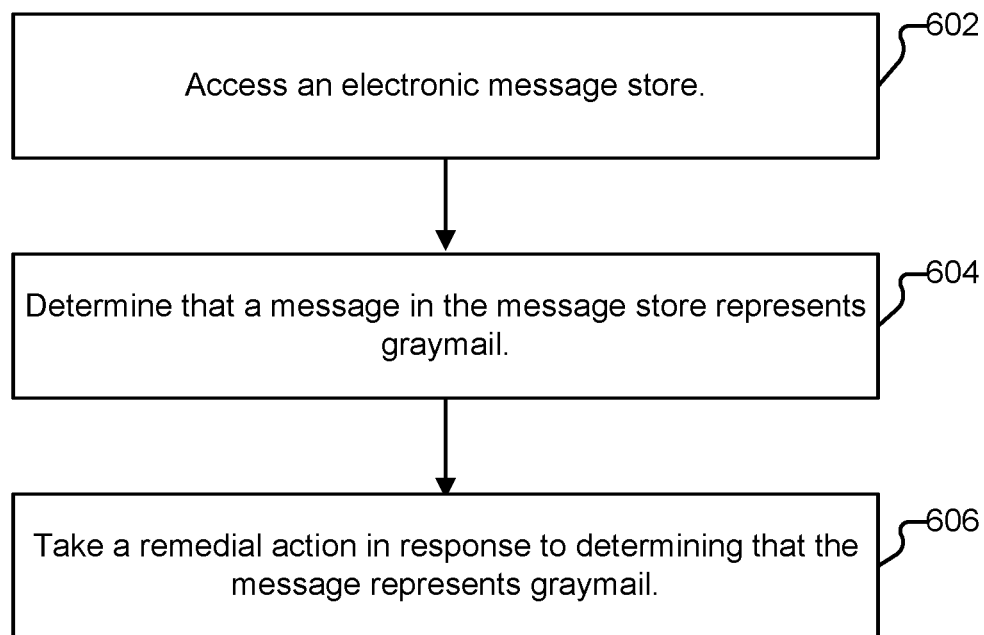
FIG. 6 illustrates an example of a process for managing potential graymail of an organization.

FIG. 6 illustrates an example of a process for managing potential graymail of an organization. In various embodiments, process 600 is performed by a threat detection platform, such as threat detection platform 400. The process begins at 602 when an electronic message store is accessed. As one example, an electronic message store is accessed by threat detection platform 300 when threat detection platform 300 receives an indication (e.g., provided by an API) that cloud-based email suite 308 has received one or more messages that have not yet been processed by threat detection platform 300. Threat detection platform 300 can then obtain access to each of the unprocessed messages (e.g., via an API) for processing. At 604, a determination is made that a first message included in the electronic message store represents graymail. As discussed above, in various embodiments, threat detection platforms (e.g., 300 and/or 400) include scoring modules (e.g., 208 and/or 402) that use various models/heuristics/etc., as applicable, to determine whether the messages that they process are likely to be graymail or not, including by accessing a profile associated with an addressee (e.g., indicating per-user preferences for different types of graymail handling, and applying those preferences in the context of the message being processed). As further discussed above, such determinations can be a probability metric (e.g., a given message is 98% likely to be graymail), binary (e.g., a given message is graymail), or a sub-classification (e.g., a given message is a newsletter). At 606, and in response to determining that the message represents graymail, a remedial action is taken. As discussed above, in various embodiments, threat detection platforms (e.g., 300 and/or 400) include remediation modules (e.g., 210 and/or 410) that provide graymail remediation services (e.g., 302 and/or 406). Examples of actions that can be taken at 606 include determining whether or not the user has a graymail (or set of graymail) folder(s), creating one(s) if not, and moving the graymail from the user's inbox to the applicable graymail folder. Also as discussed above, if the user subsequently takes an action with respect to the message that was moved by the graymail remediation service to the graymail folder, such action can be used to refine future actions taken by the threat detection platform on behalf of the user (e.g., by not moving similar messages to the graymail folder in the future).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   establish, on behalf of an enterprise, a connection with and using an application programming interface (API) to access an electronic message store that includes a series of communications received by an employee of the enterprise;

determine that a first message included in the electronic message store represents graymail, including by accessing a profile associated with an addressee of the first message, and including by applying a set of machine learning models trained using a plurality of different types of graymail as ground truth training data wherein the set of machine learning models can collectively identify graymail and further classify the graymail into one or more of a variety of subcategories;

take a remedial action in response to determining that the first message represents graymail; and at a time subsequent to when the remedial action is taken, receive an indication that the addressee has taken an action with respect to the first message, and in response to receiving the indication that the addressee has taken the action, update a rule regarding future remedial actions; and a memory coupled to the processor and configured to provide the processor with instructions.

2. The system of claim 1, wherein determining that the first message represents graymail includes determining that the first message comprises a promotional message opted into by a recipient of the first message, including by using a model trained using promotional messages.

3. The system of claim 1, wherein determining that the first message represents graymail includes determining that the first message comprises a newsletter, including by using a model trained using newsletter messages.

4. The system of claim 1, wherein determining that the first message represents graymail includes determining that the first message comprises an event invitation, including by using a model trained using event invitation messages.

5. The system of claim 1, wherein determining that the first message represents graymail includes determining that the first message comprises a cold call, including by using a model trained using cold call messages.

6. The system of claim 1, wherein taking the remedial action includes determining whether a recipient of the first message has an existing graymail folder.

7. The system of claim 6, wherein, in response to determining that the recipient does not have an existing graymail folder, the processor is further configured to cause a graymail folder to be created.

8. The system of claim 1, wherein taking the remedial action includes causing the first message to be moved from an inbox of a recipient of the first message to a graymail folder of the recipient.

9. The system of claim 1, wherein a first copy of the first message is addressed to a first recipient, wherein a second copy of the first message is addressed to a second recipient that is different from the first recipient, wherein taking the remedial action includes moving the first copy from an inbox of the first recipient, and wherein taking the remedial action further includes not moving the second copy from an inbox of the second recipient.

10. The system of claim 1, wherein the processor is configured to take the remedial action after a period of operating in a passive mode has concluded.

11. The system of claim 10, wherein during the period of operating in passive mode, one or more refinements to a set of remedial actions to be taken in response to determining that messages represent graymail are automatically made.

12. A method, comprising:

establishing, on behalf of an enterprise, a connection with and using an application programming interface (API) to access an electronic message store that includes a series of communications received by an employee of an enterprise;

determining that a first message included in the electronic message store represents graymail, including by accessing a profile associated with an addressee of the first message, and including by applying a set of machine learning models trained using a plurality of different types of graymail as ground truth training data, wherein the set of machine learning models can collectively identify graymail and further classify the graymail into one or more of a variety of subcategories;

taking a remedial action in response to determining that the first message represents graymail; and at a time subsequent to when the remedial action is taken, receiving an indication that the addressee has taken an action with respect to the first message, and in response to receiving the indication that the addressee has taken the action, updating a rule regarding future remedial actions.

13. The method of claim 12, wherein determining that the first message represents graymail includes determining that the first message comprises a promotional message opted into by a recipient of the first message, including by using a model trained using promotional messages.

14. The method of claim 12, wherein determining that the first message represents graymail includes determining that the first message comprises a newsletter, including by using a model trained using newsletter messages.

15. The method of claim 12, wherein determining that the first message represents graymail includes determining that the first message comprises an event invitation, including by using a model trained using event invitation messages.

16. The method of claim 12, wherein determining that the first message represents graymail includes determining that the first message comprises a cold call, including by using a model trained using cold call messages.

17. The method of claim 12, wherein taking the remedial action includes determining whether a recipient of the first message has an existing graymail folder.

18. The method of claim 17, further comprising, in response to determining that the recipient does not have an existing graymail folder, causing a graymail folder to be created.

19. The method of claim 12, wherein taking the remedial action includes causing the first message to be moved from an inbox of a recipient of the first message to a graymail folder of the recipient.

20. The method of claim 12, wherein a first copy of the first message is addressed to a first recipient, wherein a second copy of the first message is addressed to a second recipient that is different from the first recipient, wherein taking the remedial action includes moving the first copy from an inbox of the first recipient, and wherein taking the remedial action further includes not moving the second copy from an inbox of the second recipient.

21. The method of claim 12, wherein the remedial action is taken after a period of operating in a passive mode has concluded.

22. The method of claim 21, wherein during the period of operating in passive mode, one or more refinements to a set of remedial actions to be taken in response to determining that messages represent graymail are automatically made.

23. A computer program product embodied in a non-transitory computer readable medium and comprising computer instructions for:
- establishing, on behalf of an enterprise, a connection with and using an application programming interface (API) to access an electronic message store that includes a series of communications received by an employee of an enterprise;
- determining that a first message included in the electronic message store represents graymail, including by accessing a profile associated with an addressee of the first message, and including by applying a set of machine learning models trained using a plurality of different types of graymail as ground truth training data, wherein the set of machine learning models can collectively identify graymail and further classify the graymail into one or more of a variety of subcategories;
- taking a remedial action in response to determining that the first message represents graymail; and
- at a time subsequent to when the remedial action is taken, receiving an indication that the addressee has taken an action with respect to the first message, and in response to receiving the indication that the addressee has taken the action, updating a rule regarding future remedial actions.

* * * * *